US006822216B2

United States Patent
Lang et al.

(12) United States Patent
(10) Patent No.: US 6,822,216 B2
(45) Date of Patent: Nov. 23, 2004

(54) OBSCURATION DETECTOR

(75) Inventors: Scott Lang, Geneva, IL (US); Gregory A. Wischstadt, Streamwood, IL (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/041,724

(22) Filed: Jan. 8, 2002

(65) Prior Publication Data

US 2003/0127585 A1 Jul. 10, 2003

(51) Int. Cl.[7] .............................. H01J 40/14; G01J 1/42; G08B 13/18
(52) U.S. Cl. ....................... 250/221; 250/573; 340/556; 356/225
(58) Field of Search .............................. 250/221, 222.1, 250/573, 574, 222.2, 559.3; 356/432, 436, 437, 438, 225, 233; 340/628, 630, 632, 555, 557, 556

(56) References Cited

U.S. PATENT DOCUMENTS

| | | | |
|---|---|---|---|
| 3,544,224 A | * | 12/1970 | Friedl ........................ 356/432 |
| 3,779,650 A | * | 12/1973 | Crowley ..................... 356/438 |
| 4,126,396 A | * | 11/1978 | Hartmann et al. .......... 356/434 |
| 4,131,888 A | | 12/1978 | Galvin |
| 4,144,459 A | * | 3/1979 | Malinowski ................. 250/574 |
| 4,687,924 A | | 8/1987 | Galvin et al. |
| 4,749,871 A | | 6/1988 | Galvin et al. |
| 4,763,115 A | | 8/1988 | Cota |
| 4,823,015 A | | 4/1989 | Galvin et al. |
| 4,827,247 A | | 5/1989 | Giffone |
| 5,053,754 A | | 10/1991 | Wong |
| 5,085,508 A | | 2/1992 | Hawkinson |
| 5,103,096 A | | 4/1992 | Wong |
| 5,260,765 A | | 11/1993 | Hawkinson |
| 5,416,575 A | * | 5/1995 | Schwartz et al. .......... 356/243.1 |
| 5,546,074 A | | 8/1996 | Bernal et al. |
| 5,767,776 A | | 6/1998 | Wong |
| 5,798,701 A | | 8/1998 | Bernal et al. |
| 5,821,866 A | | 10/1998 | Bernal et al. |
| 5,828,458 A | * | 10/1998 | Taylor et al. ............... 356/440 |
| 5,936,533 A | | 8/1999 | Bernal et al. |
| 5,966,077 A | | 10/1999 | Wong |
| 6,107,925 A | | 8/2000 | Wong |
| 6,121,627 A | * | 9/2000 | Tulip ......................... 250/559.4 |
| 6,166,647 A | | 12/2000 | Wong |
| 6,359,278 B1 | * | 3/2002 | Graham ..................... 250/343 |
| 2002/0180974 A1 | * | 12/2002 | Nawracala .................. 356/432 |

* cited by examiner

*Primary Examiner*—Kevin Pyo
(74) *Attorney, Agent, or Firm*—Welsh & Katz, Ltd.

(57) ABSTRACT

An automatically testable obscuration detector incorporates one of an electrically controllable filter or a mechanically selected filter. Filtered outputs can be compared to expected outputs by control circuitry to automatically assess detector operation.

8 Claims, 5 Drawing Sheets

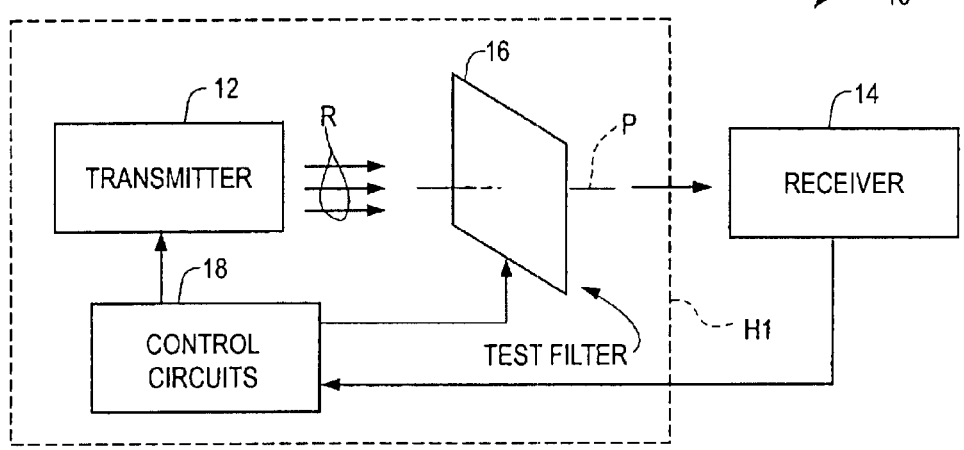
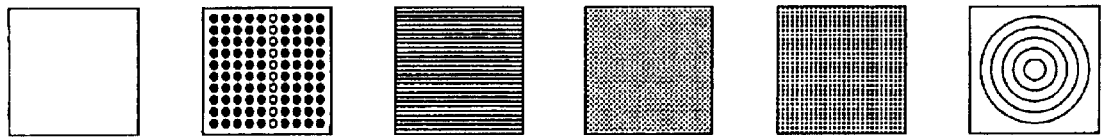
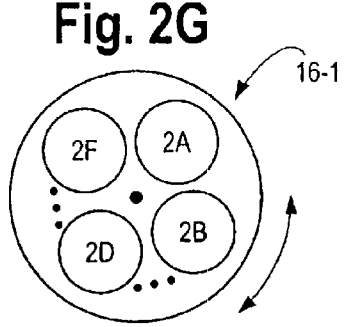

OBSCURATION DETECTOR

FIELD OF THE INVENTION

The invention pertains to obscuration-type detectors usable in monitoring a selected region for a predetermined condition such as smoke or intrusion. More particularly, the invention pertains to such detectors which include automatic test or alignment verification circuitry.

BACKGROUND OF THE INVENTION

Projected beam detectors are known for monitoring a smoke level in a region. Alternately, they can monitor a region for intruders. Such detectors usually include a source of a beam of radiant energy such as a laser or laser diode. The beam is projected across a region to be monitored to a reflector or to a sensor. A reflected beam returns to a sensor.

Outputs from the respective sensor are processed either locally or remotely. Beam strength or intensity incident on the sensor can be compared to projected beam strength or intensity.

Where smoke or an intruder is present in the path of the beam, the beam is obscured and sensor output is indicative of reduced beam strength or intensity incident thereon.

Periodic testing of installed, operational detectors is often required by regulatory agencies. One known form of testing is implemented by having maintenance personal physically at least partly obscure the beam by placing an optical barrier into the beam's path simulating a desired degree of obscuration. An alarm condition will usually register at the monitoring system's control unit or panel indicating, depending on the barrier's level of obscuration, a level of functioning. This process is labor intensive, literally requiring a system walk-through. In addition, it will require a second person at the panel to verify the existence of the expected test condition, and to reset the system or the respective detector.

An alternate known form of testing is electronic. In this process, beam strength or intensity is reduced in clear air simulating an obscuration event. Altered sensor output is detected as a response to the simulated obscuration.

While the above described form of electronic testing is all electronic and does not require a walk-through, it does not test operational functionality of a full strength, partly obscured beam. It may not represent a sufficient and acceptable test in all jurisdictions.

There continues to be a need for test methods and devices for such detectors which overcome the drawbacks and limitations of known approaches. Preferably one or more tests could be automatically carried out using normal projected beam strength. It would also be preferable if such tests could be implemented so as to be both cost effective and to provide operational benefits not available with known approaches.

SUMMARY OF THE INVENTION

A projected beam ambient condition detector, usable to monitor smoke, or, the presence of bodies such as human beings, animals or inanimate objects in a region being monitored, includes automatic test equipment. The equipment includes at least one filter interposed, or, interposable in the path of a beam which is being transmitted through a region being monitored.

In the preferred embodiment, the filter is movable by a motor. The motor receives electrical signals to move the filter into the path of the beam for the test condition and out of the path of the beam for normal condition. The filter may have a constant obscuration level or a graduated obscuration. If the filter uses a graduated obscuration, then the test position may be varied to a predetermined obscuration position on the filter. In that way, the test can be adjusted to account for the distances of the projected beam in the detection system.

At a predetermined rate or period, the control circuitry of the projected beam detector can cause a test to be conducted, wherein it will send signals to the motor to move the filter into the beam path to a test position. The control circuitry will measure the signals from the receiver circuitry, and after the test, send signals to the motor to move the filter out of the beam path to a normal position. Based upon the measurement of the signals from the receiver circuitry when the filter is not in the beam path and when the filter is in the beam path, the control circuitry will make a determination if the project beam detector is functioning properly or not. If the measured signals from the receiver circuitry during the test condition are not within predetermined limits, the projected beam detector may not be functioning properly and a trouble condition may be indicated.

The receiver circuitry for the projected beam detection system can be located in a separate housing at the opposite end of the area being monitored. Electrical connections between the two housings would allow the control circuitry to monitor the receiver circuitry. An alternate construction is for the receiver circuitry to be in the same housing as the source of the beam with a retro-reflector used to transmit the light back from the opposite end of the area being monitored.

In another embodiment, the filter is electrically alterable to predetermined obscuration levels. An example would be a filter that is optically transparent with little light loss for normal operation and is altered to obscure on the order of 50% of the light passing through it when in the test condition. In the test condition, the control circuitry sends signals to the electrically alterable filter to change the obscuration to a predetermined value that is only partially transparent or non-transparent. This electrically alterable filter would not need the motor of the preferred embodiment since no moving parts would be required to change obscuration. As in the preferred embodiment, the control circuitry will monitor the receiver circuitry in a similar manner, comparing the receiver circuitry signals between conditions where the alterable filter is transparent and at least partially transparent. Electrically altering the filter accomplishes the same function as the movement of the filter into and out of the beam path in terms of providing different levels of obscuration in the beam path.

It is also possible to test the projected beam detector by having the beam path completely blocked so that no light is transmitted to the receiver circuit. This would represent a "blocked" beam condition and where the beam is completely blocked to simulate this condition and to test the ability of the detector to recognize this situation.

Another aspect of this invention is the ability to obscure some transmitted rays of light and not others. A motor, possibly the same one that moves an obscuration filter into the beam path, could move a light blocking assembly into the beam path and restrict the light pattern to a smaller pattern than during normal operation. The restricted light pattern could be one wherein the angle of light being transmitted in the beam's path is reduced. The benefit of this aspect of the invention is that the alignment of the transmitting beam source and the receiver circuitry can be assessed.

If the transmitter and receiver are perfectly aligned, then the narrowing of the beam width will not cause a change in the signal from the receiver circuit because the same light rays are still traveling between the transmitter and receiver circuitry. However, if they are not aligned then the beam width will result in fewer light rays reaching the receiver circuitry and thus resulting a decrease in the signal from the receiver circuitry. An example of this type of structure to narrow the beam is a member with a beam-limiting hole in it. The hole only allows a predetermined width of light pass through it so it becomes beam width limiting.

This method can also use the electrically alterable approach wherein a light obscuring pattern is electrically produced on a member. In the normal mode, the member does not restrict the width of the beam. In the electrically altered mode, the member becomes opaque except for a hole in the center that allows light to pass through at a narrowed beam width.

In yet another embodiment, a plurality of filters can be carried on a mechanically movable, linear or rotary, support member. Control circuitry can position an appropriately patterned filter in the beam's path. Sensor output can be compared to one or more expected outputs.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 1 is a block diagram of a system in accordance with the present invention;

FIGS. 2A–2F illustrate various obscuration filters usable in the system of FIG. 1;

FIGS. 2G, 2H illustrate different carriers for mechanically movable versions of the filters of FIGS. 2A–2F;

DETAILED DESCRIPTION OF THE PREFERRED EMBODIMENTS

Figure 3:
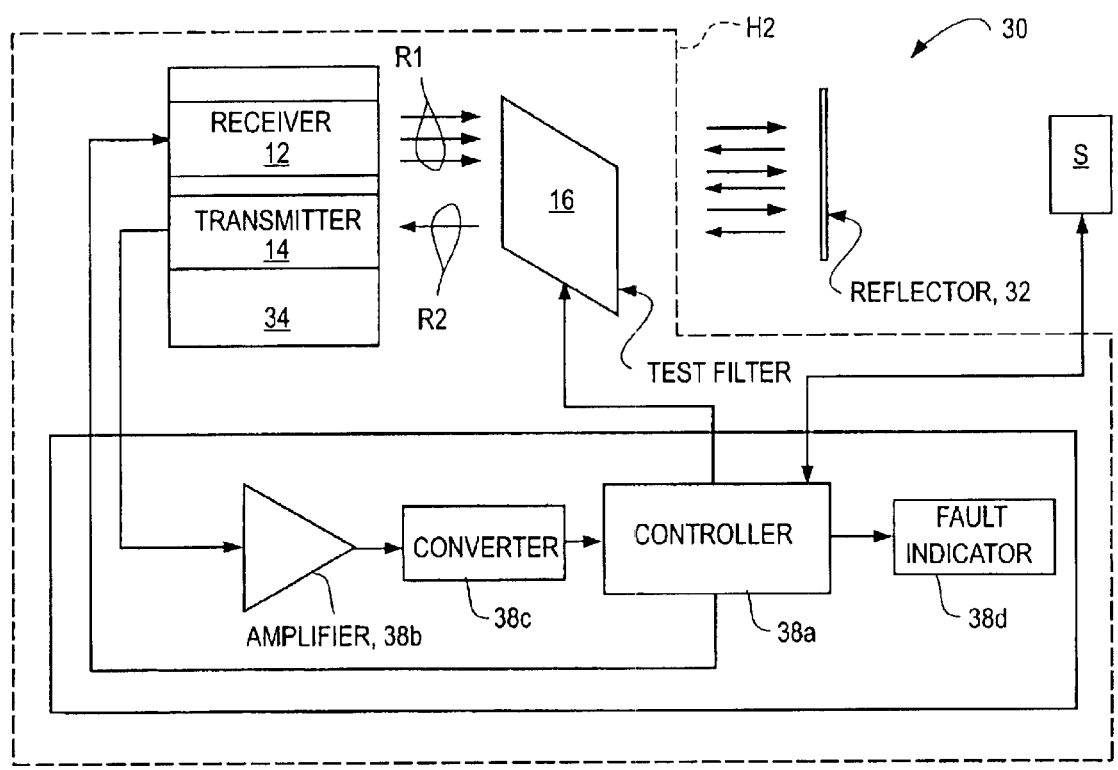
FIG. 3 is a block diagram of an alternate system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a system 10 in accordance with the present invention. System 10 includes a transmitter or source 12 of a beam of radiant energy R. The beam R can have any desired wavelength and be generated by any appropriate source such as a laser or a laser diode, light emitting diode, gas discharge tube or the like all without limitation.

Beam R is projected along path P toward receiver or sensor 14. A filter element 16 positioned in path P presents a selected pattern to at least partly block the beam R.

The source 12 and filter 16 can be located, if desired in a common housing H1, illustrated in phantom. Other configurations are possible and come within the spirit and scope of the present invention.

FIGS. 2A–2F each illustrate a different obscuration pattern presentable to beam R in path P. FIG. 2A illustrates a clear, non-obscured filter.

FIGS. 2B–2F illustrate different possible obscuration patterns usable for different functions. These include testing minimum or maximum obscuration levels and checking alignment of source 12 and sensor 14. For example, the filter of FIG. 2F can be used to test functionality by darkening all rings a predetermined amount and evaluating output from sensor 14. Alternately, only the outer rings can be darkened to check alignment, discussed subsequently.

Filter 16 can be implemented as an electrically controlled, pixel oriented, LCD display. In this configuration, filter 16 need not be movable relative to path P. Other forms of electrically controllable filter can be used without departing from the spirit and scope of the present invention.

Filter 16, alternately, can be implemented as a movable carrier of a plurality of different filter elements as in FIGS. 2A–2F. A transducer, such as a motor or solenoid, can be used to position a selected filter, such as in FIG. 2B, in path P.

The carrier can be configured as a disk with a plurality of filters carried thereon, see FIG. 2G. Alternately, the carrier can have a linear configuration, see FIG. 2H.

With reference to FIG. 1, control circuits 18 coupled to source 12, receiver 14 and filter 16 provide drive signals to source 12, and filter 16. Signals from sensor 14 can be analyzed by circuits 18.

FIG. 3 illustrates various aspects of an alternate system 30. Elements of system 30 which are the same as the corresponding elements of system 10 have been assigned the same identification numerals. System 30 can be carried in a housing H2 indicated in phantom.

In system 30, transmitted radiant energy RI passes through filter 16 and is reflected, via reflector 32 back through filter 16 to sensor 14. This provides two passes through filter 16. In this configuration, source 12 and sensor 14 can be mounted in a common fitting or mount 34 for mounting convenience and improved alignment.

A control system 36 in system 30 provides control signals to drive source 12 and filter 16. It also senses outputs from sensor 14.

Control system 36 includes a controller 38a, which could be implemented as a programmed processor. Controller 38a includes output circuits for driving source 12 and filter 16. Input amplifier 38b receives signals from sensor 14. Those signals are digitized in A/D converter 38c.

Fault indicator 38d provides a local visual/audible output indicator of test results. Controller 38a can transmit test results to or receive test/operational commands via a bidirectional interface and link 38e. Link 38e is coupled to monitoring system S which would include additional ambient condition detector, such as heat, smoke, gas, intrusion and the like as well as a common control unit or panel as would be understood by those of skill in the art.

Figure 4A:
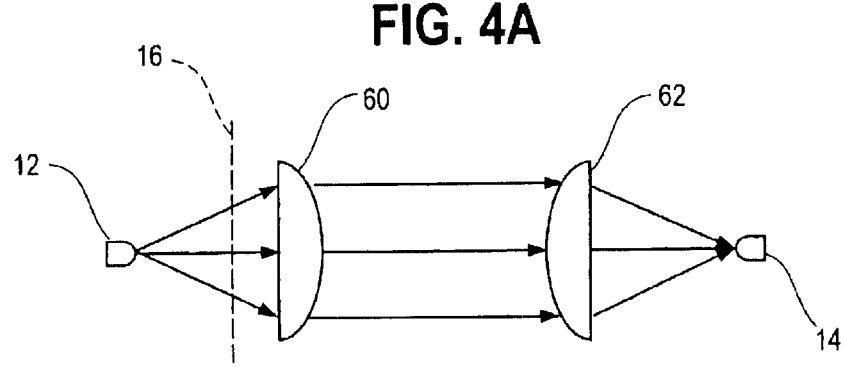
FIGS. 4A–4C illustrate different operational modes and test conditions of systems in accordance with the invention.
Figure 4B:
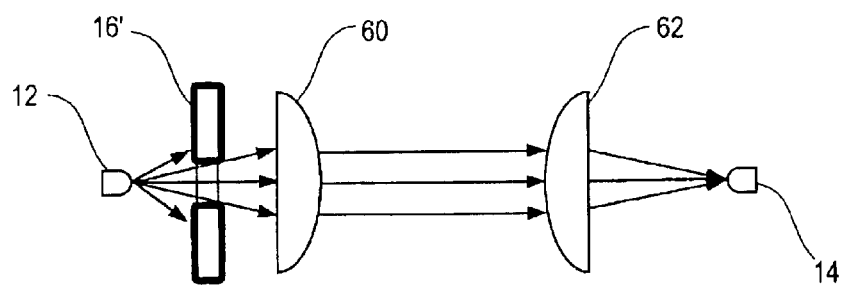
Figure 4C:
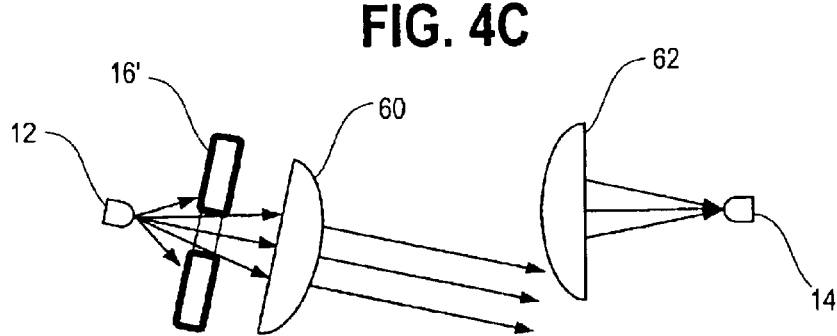

FIGS. 4A, B, C illustrate respectively normal operation, FIG. 4A, and testing alignment, FIGS. 4B, 4C of system 10. In FIG. 4A, filter 16, illustrated in phantom, is in a non-obscuring state. Emitted radiant energy R, after being optically processed, is incident on sensor 14 in a normal, monitoring condition.

In FIG. 4B, filter 16 has been set in an alignment test mode, 16' such as by displaying external circular patterns, see FIG. 2F, thereby narrowing the transmitted beam. In FIG. 4B alignment is acceptable and sensor 14 emits a corresponding output. In FIG. 4C, the source 12 is mis-aligned relative to sensor 14. In this instance, sensor 14 fails to emit the expected alignment indicating output.

Figure 4D:
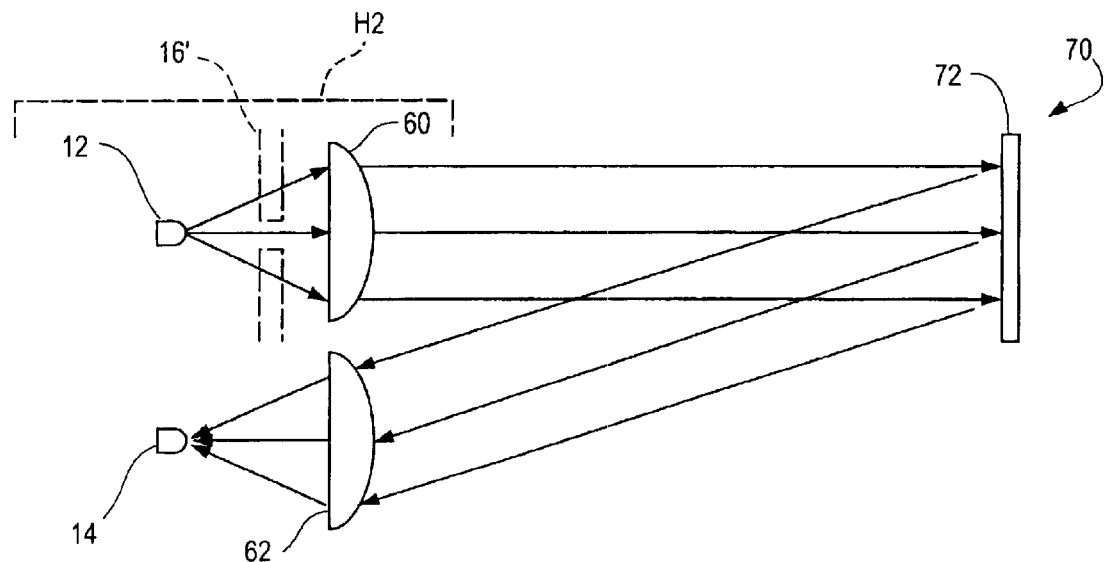
FIGS. 4D, 4E illustrate operational and test conditions of an alternate embodiment in accordance with the invention.

FIG. 4D illustrates a system 70 wherein the emitter 12, sensor 14 and associated lenses 60, 62 could be configured in a common housing, such as housing H2. In a normal operating state with proper alignment, optical signals reflect back from reflective member 72 and impinge on sensor 14. Interposing a limiting filter, such as filter 16' illustrated in phantom, will limit the optical signal that reflects onto sensor 14 but will not extensively reduce it, in a normal aligned condition, as to indicate a mis-alignment.

Figure 4E:
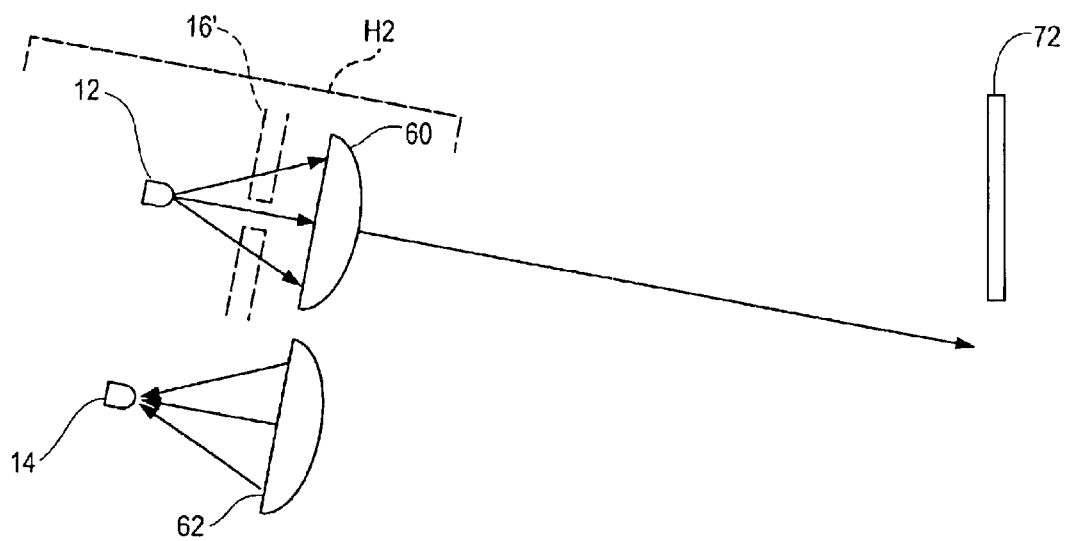

FIG. 4E illustrates system 70 with a mis-alignment of the housing H2, as well as source 12 and sensor 14. In this condition, filter 16' limits the signal incident on reflector 72 such that little or no signal will be reflected back to sensor 14 indicating a mis-alignment.

Figure 5A:
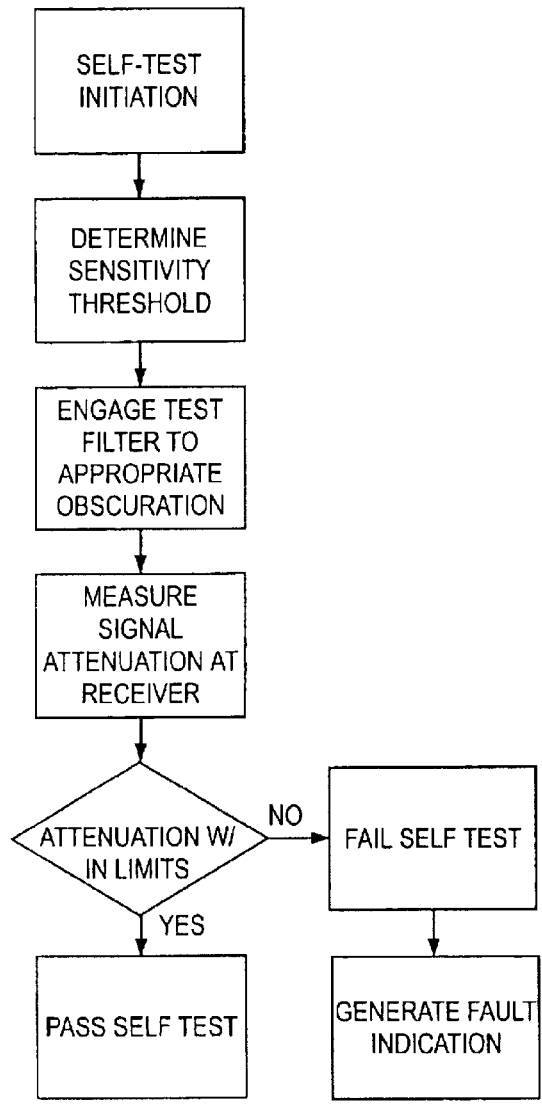
FIGS. 5A, 5B are block diagrams illustrating test methods usable with systems in accordance with the invention.
Figure 5B:
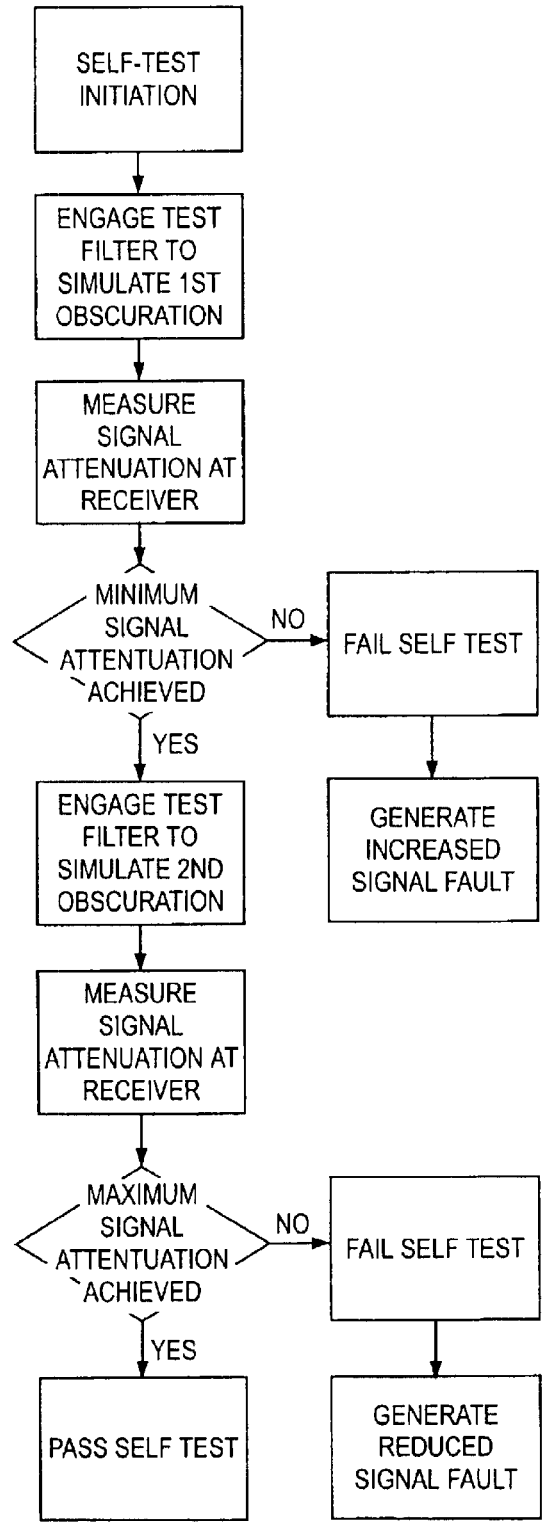

FIGS. 5A, 5B illustrate two different flow diagrams for carrying out a test of system 10 or 30 as would be understood by those of skill in the art.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A projected beam detector comprising:

a beam source, and a beam sensor, the source and the sensor are configured to project a radiant energy beam on a path therebetween through at least part of a region being monitored;

a controllable optical obscuration member at least in part in the path, where the member has an obscuration state an a non-obscuration state;

a control circuit coupled to the source, the sensor, and the member and including circuits to switch the member from a non-obscuration state to an obscuration state to test beam alignment, whereby an electrical signal coupled from the sensor to the control circuit is indicative of results of a beam alignment test.

2. A detector as in claim 1 wherein the obscuration member is movable between the states by a transducer.

3. A detector as in claim 2 wherein the transducer comprises one of an electrically driven source of rotary motion and an electrically driven source of linear motion.

4. A detector as in claim 1 where the obscuration member comprises an element having an electrically alterable transmission characteristic wherein in response to a control electrical signal, the transmission characteristic switches from the optically transmissive condition to the less optically transmissive condition.

5. A method of testing a projected beam-type obscuration detector having a source for a beam of radiant energy and a sensor thereof, the method comprising:

projecting the beam from the source along an evaluating path through a region being monitored;

sensing the projected beam during a clear air condition subsequent to traversing the evaluating path;

automatically changing a transmissive characteristic of a part of the evaluating path thereby altering unscattered beam strength impinging on the sensor to conduct a beam alignment test.

6. A method as in claim 5 which includes maintaining a record of test results, and repeating the steps at least intermittently.

7. A method as in claim 5 where the transmissive characteristic is changed by optically blocking at least in part, the projected beam prior to the beam being sensed.

8. A test apparatus for a projected beam-type detector comprising:

a control circuit which can be coupled to the detector;

an electrically controllable obscuration member which has at least first and second states, coupled to the control circuit, the first state corresponds to a normal operational state, the second state corresponding to partial optical obscuration, a test state, where the control circuit includes circuitry to test the detector by switching the obscuration member from the first, normal operational state to the second, test state to alter a beam transmission characteristic whereupon an output indicative of the test is coupled to control circuit; and where the obscuration member includes a beam alignment test state, the control circuit including circuitry to select that state to automatically test beam alignment.

* * * * *